United States Patent [19]

Rosen

[11] Patent Number: 4,972,151
[45] Date of Patent: Nov. 20, 1990

[54] STEERED-BEAM SATELLITE COMMUNICATION SYSTEM

[75] Inventor: Harold A. Rosen, Santa Monica, Calif.

[73] Assignee: Hughes Aircraft Company, Los Angeles, Calif.

[21] Appl. No.: 782,770

[22] Filed: Oct. 1, 1985

[51] Int. Cl.[5] ............................................ H04B 7/185
[52] U.S. Cl. .................................................... 342/354
[58] Field of Search ........................................ 342/354

[56] References Cited

U.S. PATENT DOCUMENTS 3,331,071  7/1967  Preston .

FOREIGN PATENT DOCUMENTS 2517626  6/1983  France .

OTHER PUBLICATIONS

Bell Laboratories Record, vol. 58, No. 2, Feb. 1980, D. O. Reudink et al.: "Scanning Spot Beams-A New Approach to Satellite Communications", pp. 38–45.
IEEE Transactions on Antennas and Propagation, vol. AP-24, No. 4, Jul. 1976, M. R. Patel et al.: "Radiation Distortions in Fast Frequency-Scanned Antenna Arrays", pp. 537–539.
IEEE Conference Record of the National Telecommunications Conference, Nov. 30–Dec. 4, 1980, P. R. Hirscher-Marchand et al.: "System Design and Technology Development for an EHF Beam-Hopped Satellite Downlink", pp. 17.5.1–17.5.7.
Journal of Spacecraft and Rockets, vol. 17, Jan.–Feb. 1980, No. 1, D. O. Reudink et al.: "Rapid-Scan Area--Coverage Communication Satellite", pp. 9–14.
Antenna Engineering Handbook, Second Edition, Richard C. Johnson and Henry Jasik, Editors, McGraw-Hill Book Company, "Frequency-Scan Antennas", James S. Ajioka.

*Primary Examiner*—Thomas H. Tarcza
*Assistant Examiner*—David Cain
*Attorney, Agent, or Firm*—S. M. Mitchell; R. A. Westerlund; W. K. Denson-Low

[57] ABSTRACT

A satellite communication system employing a satellite in a geostationary orbit about the earth for communicating with ground stations disposed along a region of the earth positioned along an arc of a great circle of the earth. The satellite carries a frequency-scanning antenna array oriented for scanning a beam of electromagnetic radiation in one plane aligned with the arc of the great circle. Each position of the beam is formed with a different frequency of the radiation. The operating frequency of each ground station is selected to match the frequency of a beam directed from the satellite to the ground station. An antenna assembly formed of two confocal parabolic reflectors provides for a multiplication of the effective aperture of an array of radiating elements of the antenna, and also for a demagnification of a scan angle of radiation emanating from the array of radiating elements.

9 Claims, 6 Drawing Sheets

FREQUENCY ADDRESSABLE FAN BEAM

FREQUENCY ADDRESSABLE FAN BEAM

STEERED-BEAM SATELLITE COMMUNICATION SYSTEM

BACKGROUND OF THE INVENTION

1. Field of the Invention

This invention relates to a system employing a satellite for communication between ground stations and, more particularly, to a satellite communication system incorporating an antenna array in which a communicating beam is steered by varying a carrier frequency of the beam.

2. Description of the Related Art

Satellites are now employed for providing communication, such as telephone in land mobile service, between distant points on the surface of the earth. One embodiment of such a system is of considerable interest, namely, an embodiment wherein the satellite travels in a geostationary orbit about the earth. For example, the satellite may be located at a fixed position above the United States. The satellite would carry an antenna having a sufficient beam width in the north-south direction and in the east-west direction to permit the reception and transmission of communication signals between any two points in the United States. The beam width in the north-south direction can be enlarged to include both United States and Canada, if desired. A beam width of approximately 4.5° in the north-south direction is sufficient to cover both Canada and the United States. The beam width in the east-west direction should be approximately 8° to provide the desired coverage. A problem arises in that the use of an antenna having the foregoing beam width in the north-south and east-west directions has less signal gain than is desired. This necessitates larger power amplifiers for driving radiating elements of the antenna.

In previous satellite communication systems, such a wide beam width antenna has employed at least two overlapping beams to provide the coverage, the generation of such beams with a desired overlap requiring the use of separate large reflectors each having a diameter of about 16 feet. In the construction of satellites, however, it is desirable to reduce physical sizes, weights, and power requirements to facilitate the construction and launching of such satellites.

SUMMARY OF THE INVENTION

The present invention provides a system for communicating via satellite between ground stations. The system comprises a set of ground stations spaced apart along an arc of the earth's surface and a satellite positioned above the earth in view of the arc. An array of radiating elements is deployed on the satellite, and a frequency responsive beam former connected to the radiating elements is provided for forming a beam of electromagnetic radiation. The beam is steerable in response to a carrier frequency of the radiation to intercept individual ones of the stations in seriatim. The frequencies of an up-link carrier and of a down-link carrier respectively associated with respective ones of the ground stations vary monotonically with position along the arc to permit automatic positioning of a beam from the satellite to a ground station upon energization of a carrier frequency assigned to the ground station.

Another important feature of the invention permits the simplification of the structure of a communication satellite with respect to the construction of an antenna assembly. A simplified antenna structure is obtained by the use of two confocal parabolic reflectors, one of which is large and one of which is small. The large reflector is folded during launch of the satellite, and is subsequently unfurled for deployment. The antenna configuration provides for a magnification of an antenna aperture of an array of antenna radiators so as to present a relatively large aperture for relatively few radiators.

These and other features and advantages of the present invention will be understood from the following more detailed description in accordance with the drawings in which:

BRIEF DESCRIPTION OF THE DRAWINGS

The aforementioned aspects and other features of the invention are explained in the following description, taken in connection with the accompanying drawings wherein.

DESCRIPTION OF THE PREFERRED EMBODIMENTS

The present invention comprises a novel system for communicating between ground stations. The following description is presented to enable any person skilled in the art to make and use the invention, and is provided in the context of a particular application and its requirements. Various modifications to the preferred embodiment will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
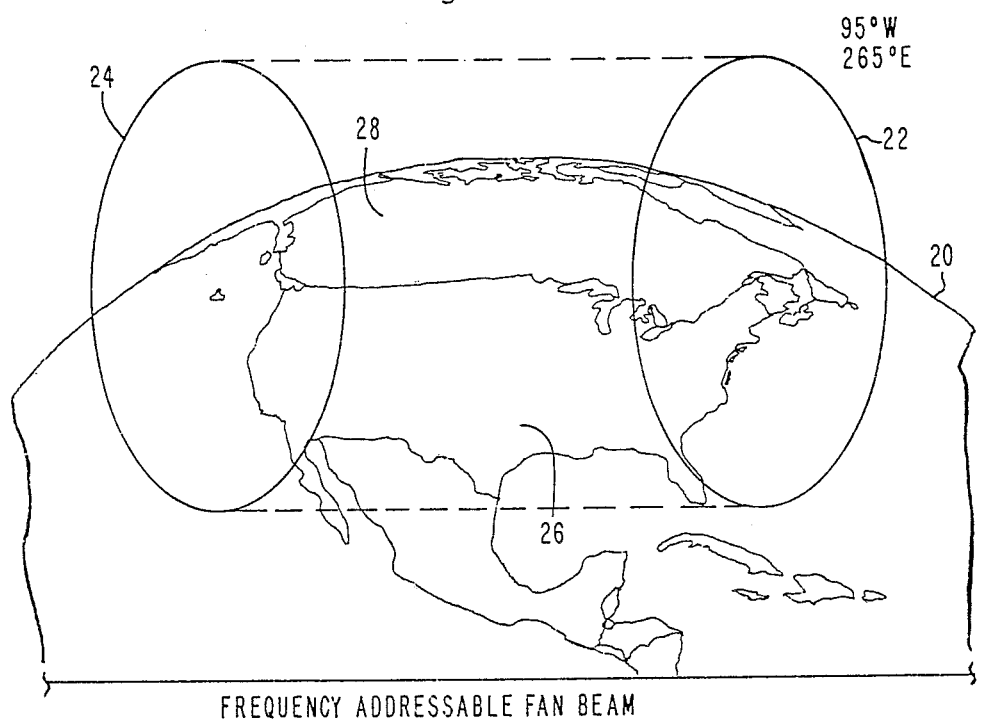
FIG. 1 is a stylized pictorial view of spot beams formed on the surface of the earth in accordance with the present invention.

FIG. 1 illustrates exemplary spot beams produced by a satellite (not shown) employing the present invention and which is in geosynchronous orbit above the earth (20). Two spot beams (22, 24) are illustrated. A first spot beam (22) extends substantially along the eastern coast of the United States (26) and Canada (28). A second spot beam (24) extends substantially along the western coast of the United States (26) and Canada (28). The satellite, in accordance with the present invention, transmits and receives information-carrying radiation to and from ground stations located within regions of the earth's surface encompassed by the respective first and second spot beams (22, 24). As will be explained more fully below, the coverage patterns of the respective first and second spot beams (22, 24) are selected such that frequency bands available for communications are concentrated in regions of the surface of the earth (20) where the largest communications capacity is necessary. Thus, antenna gain usage is optimized by substantially limiting the amount of antenna gain which is incident upon regions wherein relatively little communications capacity is necessary. Therefore, the power requirements of the satellite's antenna are relatively low because antenna gain is not greatly dissipated in regions where satellite communications demands are relatively low, such as in sparsely populated regions.

The satellite carries an antenna system which provides for a one-dimensional beam scan across the surface of the earth (20). While such a scan can be directed along an arc of the earth's surface such as a longitude or a latitude, or an arc inclined relative to a latitude, the scanning can be accomplished most efficiently for the geography depicted in FIG. 1 by scanning in the east-west direction providing a scan path which follows an arc of a great circle of the earth (20). In the preferred embodiment of the invention, the scanning is implemented by using fixed delays (as will be described hereinafter) among radiating elements of the antenna system and by employing different frequencies for different geographical locations on the surface of the earth (20). Thereby, the scanning is accomplished by variation of the carrier frequency of the radiation for each position of a beam, and, in addition, a plurality (not shown) of the beams can be generated simultaneously by the provision of different frequencies of electromagnetic radiation in each of the beams.

While a fan beam, narrower in the east-west direction than in the north-south direction, may be employed to minimize the required electromagnetic power, a significant decrease in the required power in combination with a simplicity of antenna structure can be obtained by use of an array of radiating elements (to be described hereinafter) having circular symmetry and providing beams of circular cross section. Accordingly, the antenna system in a preferred embodiment of the invention provides a beam with a generally circular cross section and a width of 4.5°.

As an example in the use of the invention, the satellite may be designated for land mobile telephone service. Two frequency bands are assigned for such service, namely, 866-870 MHz for the down-link band and 821-825 MHz for the up-link band. Each of these bands has a width of 4 MHz which may be subdivided into approximately 1000 frequency slots which are individually assignable to individual ground stations on the surface of the earth (20) for companded single sideband voice communication. If the stations were uniformly positioned from east to west, with each station being at a different longitude, assignable channels comprising an up-link and a down-link would be available within a scan angle of approximately 0.1 degree.

Since the channels would be uniformly spaced apart in frequency, a beam would be uniformly stepped in the east-west direction as the down-link (or up-link) frequency was shifted from one channel to the next channel For a uniform distribution of the stations in the east-west direction, the beam could be centered with respect to the east-west component thereof, upon each of the stations. However, as a practical matter, the stations tend to be clustered in various geographic areas of the United States (26) and Canada (28) providing a nonuniform distribution of the stations along the east-west scanning path of the beam. Consequently, a peak signal amplitude cannot be obtained for all of the stations.

By way of example, assuming that 25 ground stations are located within a scan angle of 0.1°, the corresponding reduction from peak signal amplitude is less than 0.01 dB (decibels). This represents a significant improvement over previously available satellite communication systems employing separate fixed beams wherein the average loss in signal gain relative to peak signal gain in the east-west direction was approximately 0.8 dB. As noted above, such previous satellite communication systems employed antenna systems having a plurality of large antenna reflectors, measuring approximately 16 feet in diameter, while the antenna system of the invention requires only a single large reflector as will be described hereinafter. Thus, the invention provides for improved uniformity of signal gain with a simplified mechanical structure of the antenna system.

Figure 2:
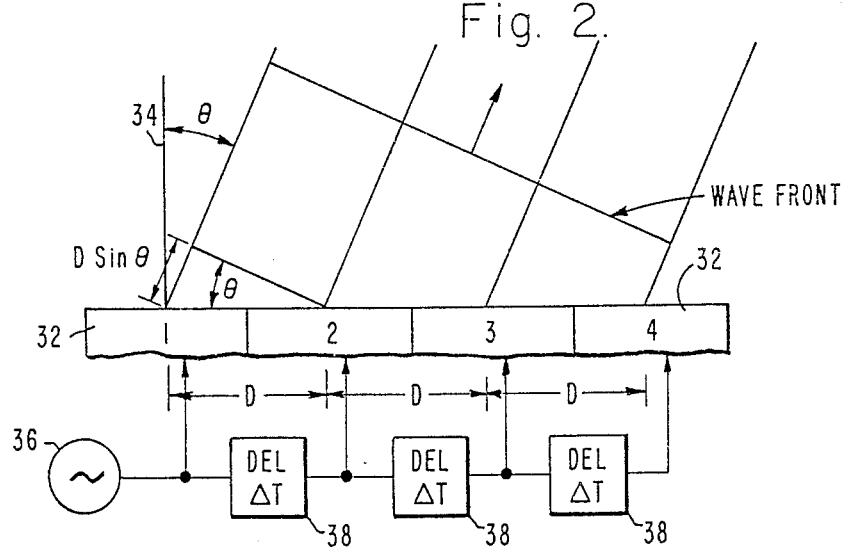
FIG. 2 is a diagram showing a relationship between an outgoing wavefront and the elements of a line array of radiators.

FIG. 2 presents a diagram useful in explaining the frequency scanning operation of the antenna system. A set of 4 radiating elements (32) are arranged side by side along a straight line, and face an outgoing wavefront of electromagnetic radiation. The angle of incidence of the wavefront or beam scan angle, is measured relative to a normal (34) to the array of elements (32). A frequency scan is generated in a planar array antenna by introduction of a progressive time delay into the array. The progressive time delay provides for a difference in the phases of signals excited by adjacent ones of the elements (32) such that the phase difference is proportional to the frequency of the radiated signals. This explanation of the operation assumes an outgoing wavefront, it being understood that the operation of the array of elements (32) is reciprocal so that the explanation applies equally well to an incoming wavefront. The relationship of scan angle to frequency, element spacing, and time delay is given by the following equations:

$$\frac{2\pi D}{\lambda} \sin \theta = \Delta\psi = 2\pi f \Delta T, \qquad (1)$$

therefore $$\sin \theta = \frac{\lambda}{D} f \Delta T, \qquad (2)$$

wherein:
D = spacing between elements,
Θ = beam scan angle,
λ = wavelength of radiation,
ψΔ = phase increment between adjacent elements,
f = frequency relative to band center; and
ΔT = time delay increment between adjacent elements.

The radiating elements (32) are energized via a source (36) of microwave energy and a series of delay units (38)

coupled to the source (36). Each of the delay units (38) provides the time delay increment referred to above in Equations (1) and (2). The source (36) is connected directly to an element (32) at the left side of the array while the next element (32) is connected by one of the delay units (38) to the source (36). The signals applied by the source (36) to the third and the fourth of the elements (32) are delayed, respectively, by two and three of the delay units (38). This provides the linear phase relationship to provide the scan angle for the outgoing wavefront. The phase increment between two adjacent ones of the radiators (32) is proportional to the product of the frequency of the radiation and the delay increment. When this product is equal to 360°, the wavefront propagates in a direction normal to the array of elements (32). Increasing values of frequency produce greater phase shift to direct the wavefront to the right of the normal (34) as shown in FIG. 2, while decreasing amounts of frequency produce less phase shift and drive the wavefront to the left of the normal (34). Thereby, the wavefront can be scanned symmetrically about the array of elements (32).

Figure 3:
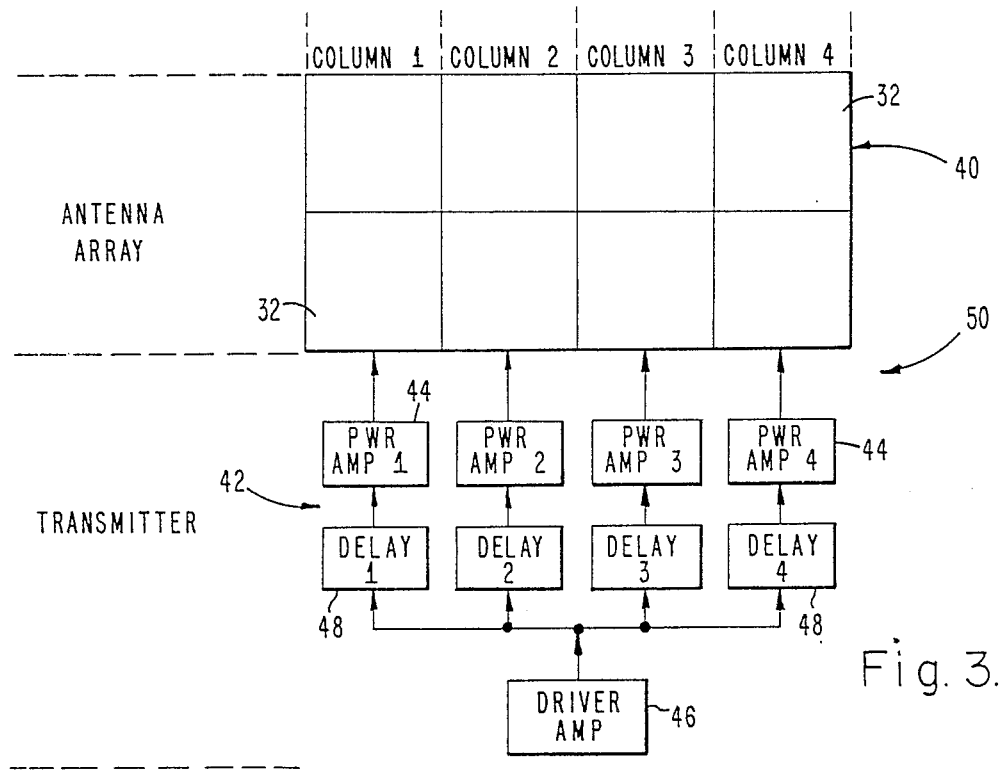
FIG. 3 shows diagrammatically the energization of a two-dimensional array of radiators during a transmission mode.

FIG. 3 shows an embodiment of electrical circuitry for activating a two-dimensional array (40) of radiating elements (32) arranged in rows and columns to form a rectangular 4×2 array. Each radiating element (32), for example, can be constructed in a well-known form of a dipole radiator. The electrical circuitry is shown as a transmitter (42) comprising a set of four power amplifiers (44), a driver amplifier (46), and a set of four delay units (48) connecting input terminals of respective ones of the power amplifiers (44) to a common output terminal of the driver amplifier (46). The array (40) of the radiating elements (32) serves as an antenna (50) which is scanned in one direction. Both elements (32) in each column are driven in parallel with a common phase. Thereby, the steering of the resultant beam of radiation follows the operation disclosed with reference to the line array of FIG. 2. Each of the delay units (48) is conveniently fabricated of lumped parameter all-pass networks employing well-known circuitry. The delay units (48) are located ahead of the power amplifiers (44) so as to operate at relatively low power and thereby minimize power loss.

Figure 4:
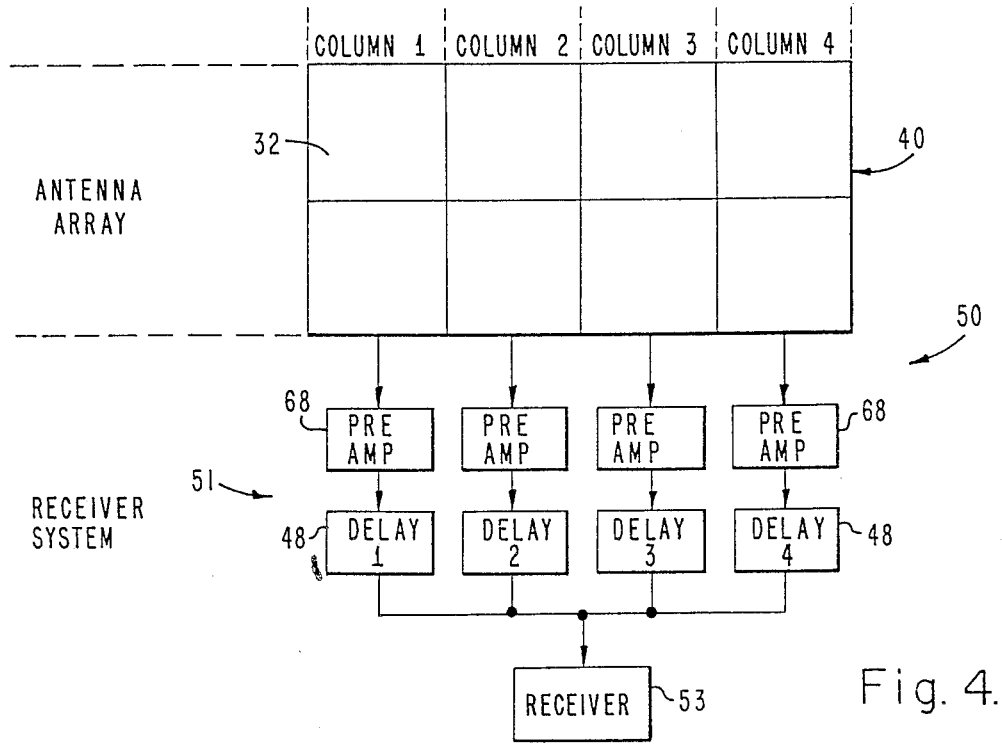
FIG. 4 shows a diagram corresponding to that of FIG. 3 for receiving an electromagnetic wave.

FIG. 4 shows a circuit arrangement for receiving up-link signals at a satellite, the arrangement of FIG. 4 having similarities to the arrangement of FIG. 3. FIG. 4 shows an antenna (50) with a rectangular 4×2 array (40) of radiating elements (32), previously shown in FIG. 3. The elements (32) in each column are connected in series with the total voltage developed by the series combination of the elements (32) being applied to preamplifiers (68) of a receiver system (51). There is one preamplifier (68) for amplifying the signals received by each column of radiating elements (32). The respective output terminal of each preamplifier (68) is coupled to a respective delay unit (48). The four delay units (48) are each connected to a common input terminal of a receiver (53). The operation of the delay units (48) in FIG. 4 is the same as that disclosed earlier with reference to FIG. 3. In both the arrangements of FIGS. 3 and 4, the delay units (48) introduce a differential delay between the signals provided to or received by elements (32) of the respective columns, which differential delays are the same as those imparted by the delay units (38) as has been disclosed with reference to FIG. 2. For each frequency employed in communicating with a ground station, the circuitry of FIG. 4 provides a separate up-link beam in the same manner as has been disclosed for the formation of the down-link beams of FIG. 3. The preamplifiers (68) and the delay units (48) comprise the receiver system (51). It is understood that the receiver (53) is tuned to the frequency bands of the respective up-link communication channels, thereby permitting simultaneous reception of signals from a plurality of stations.

Figure 5:
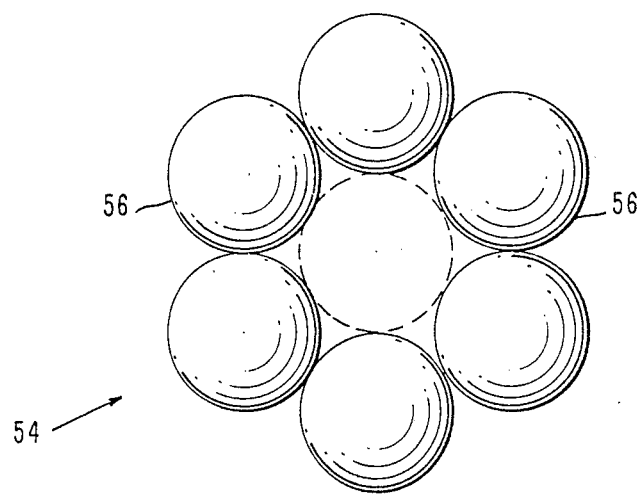
FIG. 5 shows an alternate configuration of antenna elements of an antenna array of the present invention.

It is also noted that the 4×2 configuration of the array (40) in FIG. 4 is presented by way of example in explaining the operation of the beam forming process. An alternate configuration of the array to be employed in the preferred embodiment of the satellite is illustrated by way of example in FIG. 5. It comprises a hexagonal array (54) of seven radiating elements as disclosed in FIG. 5. The same hexagonal array (54) of radiating elements (56) would be employed for both up-link and down-link communication.

Figure 6:
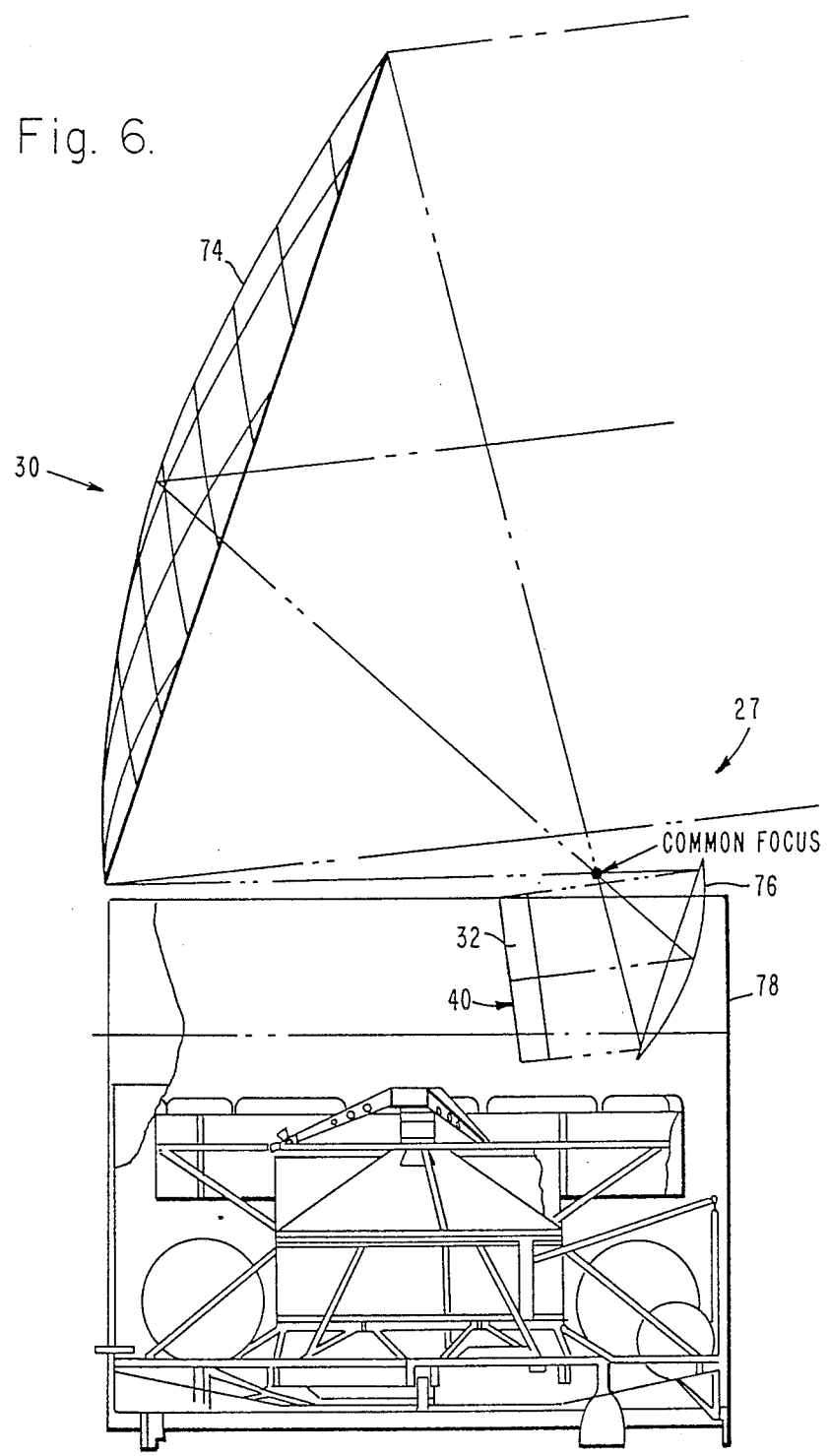
FIG. 6 shows diagrammatically an antenna assembly for use by the satellite in carrying out the invention, the view of FIG. 6 showing a side view of a subreflector and a main reflector.
Figure 7:
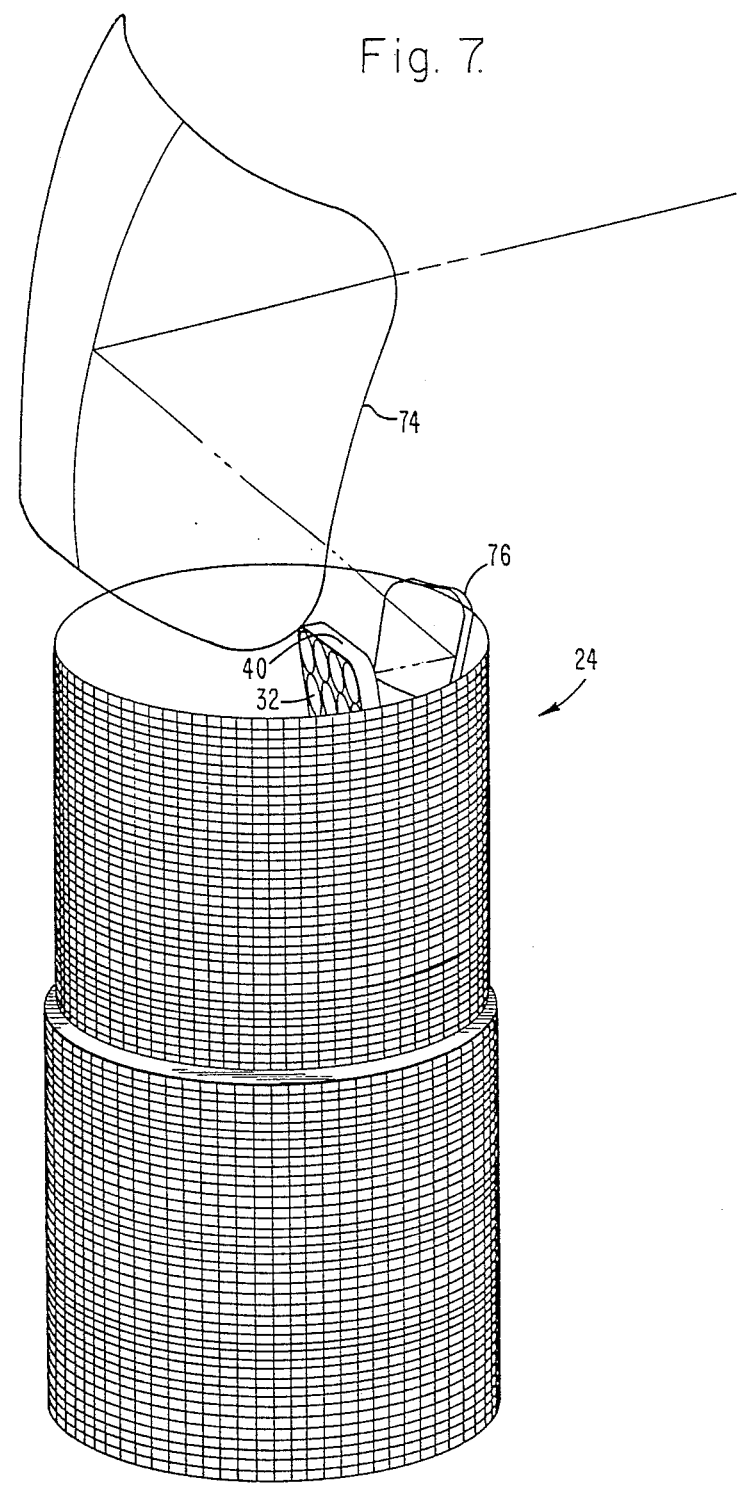
FIG. 7 shows a front view of the main reflector, the subreflector and a 4×2 array of primary radiators facing the subreflector in the assembly of FIG. 6.

FIGS. 6 and 7 show structural details of an antenna system (30) carried by a satellite (27) incorporating the present invention. The antenna system (30) comprises a main reflector (74), a subreflector (76), and the aforementioned 4×2 array (40) of radiating elements (32), all of which are supported by a frame (78). The array (40) of radiators (32) is rigidly secured in front of the subreflector (76), and with the subreflector (76) are located within the satellite (27). The main reflector (74) is substantially larger than the subreflector (76), and due to the larger size, is folded during launch, and is subsequently unfurled when the satellite, or spacecraft (24) has been placed in orbit. Upon unfurling of the main reflector (74), the main reflector (74) extends outside of the satellite (27). Also shown in FIGS. 6 and 7, within the frame (78), is other spacecraft equipment such as rocket engines and fuel tanks, thereby to demonstrate that the antenna system (30) can be easily carried by the satellite (27).

In accordance with a feature of the invention, the arrangement of the components of the antenna system (30) provides a significant reduction in weight and complexity for a satellite antenna over that which has been employed heretofore. This is accomplished by fabricating the main reflector (74) and the subreflector (76) with parabolic reflecting surfaces, the two surfaces being oriented as a set of confocal parabolas. The effect of the two confocal parabolas is to magnify the apparent dimensions of the 4×2 array (40). Such configuration of reflecting surfaces in an antenna is described in an article entitled "Imaging Reflector Arrangements to Form a Scanning Beam Using a Small Array" by Dragone and Gans, appearing in the *Bell System Technical Journal* issue of February 1979. With the configuration employed in the preferred embodiment of the invention, as shown in FIGS. 6 and 7, the magnification factor is 4.7. The eight radiating elements (32) of the array (40) represent a substantial reduction in complexity of the antenna since, if a direct radiator of similar sized elements had been employed, a total of 155 radiating elements would have been needed to give the same antenna performance. For the case of the foregoing up-link and down-link frequency bands, and for the case of the radiating elements (32) having a width of approximately one wavelength, a suitable value of differential delay, as provided by the delay units (38) of FIG. 2 or the delay units (48) of FIGS. 3 and 4, is 185 nanoseconds for the case of substantially uniform distribution of ground stations on the surface of the earth (20). To provide the east-west coverage of 8°, the up-link and the down-link beams are scanned through an arc from −4° to +4°. In view of the magnification factor of 4.7, the scan angle of the array (40) of radiating elements (32) must be enlarged by the same magnifying factor, 4.7, from that of the output scan from the main reflector (74). Therefore, the beam produced by the radiating elements (32) must be scanned through an arc of 18.8° to either side of a normal to the array (40). The foregoing value of differential delay, namely, 185 nanoseconds, provides the 18.8° scan to either side of the normal to the array (40).

Figure 8:
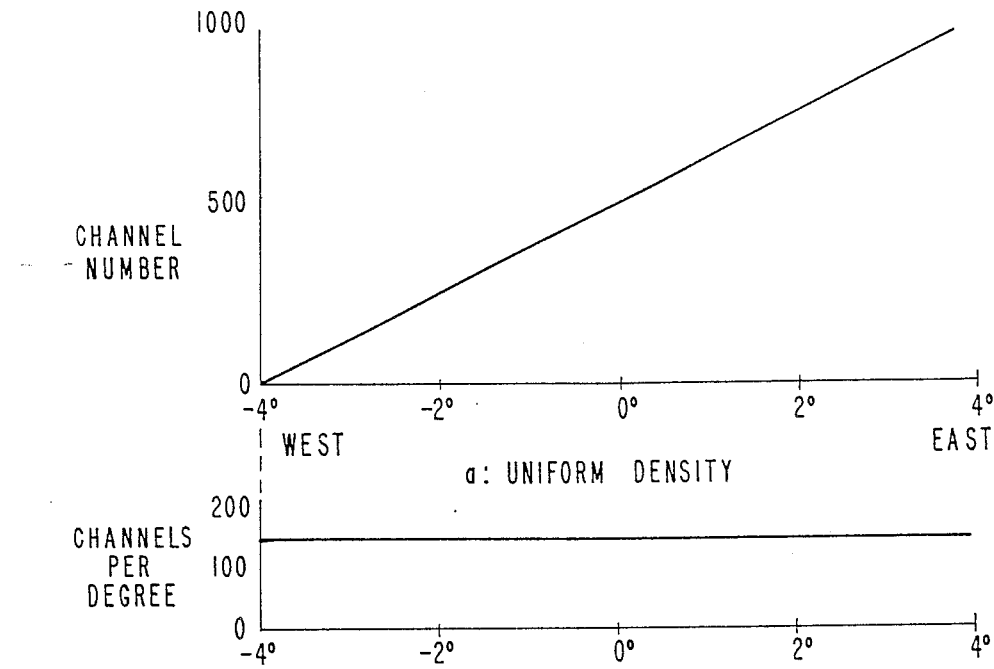
FIG. 8 shows a linear distribution of ground stations, identified by channel number, as a function of beam-steering angle off boresight for the antenna assembly of FIG. 6.
Figure 9:
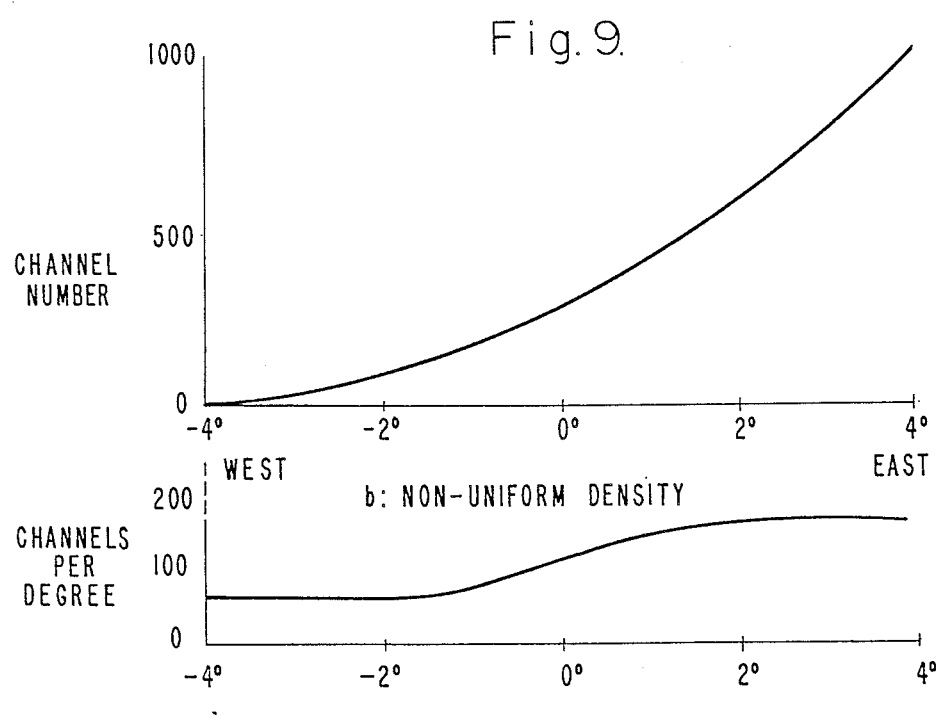
FIG. 9 shows a nonlinear distribution of ground stations, identified by channel number, as a function of beam-steering angle off boresight for the antenna assembly of FIG. 6.

FIGS. 8 and 9 show relationships between the number of communication channels between the satellite (27) and ground stations corresponding with angular deviation of the scanned beam relative to a normal to the array (40) of radiating elements (32). FIG. 8 illustrates an ideal situation of uniformly distributed ground stations (22) between the East Coast and the West Coast of the United States and Canada, as portrayed in FIG. 1. FIG. 9 illustrates a nonuniform distribution of ground stations wherein a greater number of ground stations are found on the Eastern side of the United States. The upper graph of FIG. 8 shows a linear relationship between the number of stations traversed by an output beam from the main reflector (74) as the beam scans across the United States from west (−4°) to east (+4°). The number of channels per degree, as shown in the lower graph of FIG. 8, has a constant value of 1000/8 = 125.

In the nonuniform case of FIG. 9, the number of channels is seen to accumulate relatively slowly for a westerly orientation of the output beam from the satellite (27), with the number of channels accumulating more rapidly for easterly orientations of the scanned beam. This is indicated by the curved line in the upper graph of FIG. 9. The lower graph of FIG. 9 shows a variation in the number of channels available for communication per degree of scan, there being a reduced number of channels per degree for a westerly directed beam, and an increased number of channels per degree for an easterly directed beam.

In the situation wherein the differential delays provided by the delay units (48) are independent of frequency, then an optimal direction of the scanned beam is obtained for the ideal situation of uniform distribution of ground stations. For the more likely situation of a nonuniform distribution of ground stations, the scanned beam may be displaced slightly from its designated ground station. As has been noted above, such a beam-pointing inaccuracy reduces the signal level by less than 0.01 decibels for a beam-pointing error of 0.1 degree.

The scanning can be adapted to accommodate the foregoing nonuniformity in ground-station distribution by introducing a frequency responsive component to the differential delay. In the case of the nonuniform distribution portrayed in FIG. 9, the differential delay between columns of the array (40) of radiating elements (32) (see FIG. 3) should vary between 262 nanoseconds at the low frequency end of the transmission band (low numbered channels of FIG. 9) to 131 nanoseconds in the high frequency end of the transmission band (high numbered channels of FIG. 9). The foregoing delays of 262 nanoseconds and 131 nanoseconds applies only to beam forming of down-link beams by the transmitter of FIG. 3; other values of delay are employed in the beam forming operation of up-link beams provided by the receiver of FIG. 4.

The values of delay used in the different frequency bands, namely, the up-link and down-link frequency bands, are inversely proportional to the center frequencies of these bands as is apparent from Equations (1) and (2). A reduction in the differential delay results in a reduced amount of phase shift between successive beams with a corresponding reduction in displacement of beam position on the surface of the earth (20) from one channel to the next channel. Thereby, the beam can be more accurately positioned in a region of high density of ground stations. In a corresponding fashion, an increase in the differential delay results in increased movement of the beam as the frequency is shifted from one channel to the next channel, thus accommodating positions of the beam to a less dense distribution of ground stations.

In both FIGS. 8 and 9, the channel number corresponds to a specific frequency in either the up-link or the down-link band. With respect to the positioning of ground stations along an arc of a great circle of the earth (20), as disclosed with reference to FIG. 1, it is seen that the frequencies selected for the various stations vary monotonically with position along the foregoing arc.

In view of the foregoing description, it is seen that the communication system of the present invention provides two-way communications between ground stations and a geosynchronous satellite. The assignment of specific frequencies to respective ones of the ground stations, in combination with frequency scanning of both up-link and down-link beams of the satellite (27) permits a simplification in the circuitry of the system. In addition, the use of the two confocal parabolic reflectors provides a multiplicative factor which reduces the number of elements required in the array of radiating elements. The use of a scanned beam also reduces the physical size of the antenna system by reducing the number of reflectors. There results a lighter weight, more efficient satellite communications system.

It is to be understood that the above-described embodiments of the invention are illustrative only, and that modifications thereof may occur to those skilled in the art. Accordingly, this invention is not to be regarded as limited to the embodiments disclosed herein, but is to be limited only as defined by the appended claims in which:

What is claimed is:

1. A system for communicating via satellite between ground stations, comprising:

a set of ground stations respectively within a set of station areas spaced apart along an arc of the earth's surface;

a satellite positioned in a geosynchrounous orbit above the earth and in view of said arc;

an array of radiating elements carried by said satellite;

a frequency responsive beam former connected to said radiating elements for forming a beam of electromagnetic radiation, said radiation being carried on a preselected group of carrier frequencies respectively fixedly related to said set of station areas, said beam being steerable in response to a carrier frequency of said radiation to intercept individual ones of said station areas in seriatim along said arc; and wherein frequencies of an up-link carrier and of a down-link carrier associated with respective ones of said station areas vary monotonically with position along said arc to permit automatic positioning of a beam from said satellite to one of said station areas upon energization of a carrier frequency assigned to said ground station areas.

2. A system according to claim 1 wherein up-link carriers for the respective stations are selected from an up-link band of frequencies, and down-link carriers for respective station areas are selected from a down-link band of frequencies different from said up-link band of frequencies.

3. A system according to claim 2 further comprising a second frequency responsive beam former connected to said radiating elements, each of said beam formers introducing delays between signals of respective one of said radiating elements, one of said beam formers forming beams in said up-link frequency band and the other of said beam formers forming beams in said down-link frequency band.

4. A system according to claim 1 further comprising an antenna assembly carried by said satellite for directing rays of radiation between said array of radiating elements and said station areas, said antenna assembly comprising two confocal parabolic reflectors.

5. A system according to claim 4 wherein one of said parabolic reflectors is smaller than the other of said parabolic reflectors, the smaller reflector being rigidly secured in front of said array of radiating elements.

6. A system according to claim 5 wherein the larger of said two parabolic reflectors is constructed for folding during a launch of said satellite and for unfurling upon emplacement of said satellite in orbit about the earth; and wherein said larger reflector, upon being unfurled, has a concave surface facing a concave surface of said smaller reflector, said antenna assembly multiplying the effective aperture of said array of radiating elements to a larger aperture, a scanning angle of radiation emanating from said array of radiating elements being decreased by said multiplicative factor.

7. A system according to claim 6 wherein up-link carriers for the respective station areas are selected from an up-link band of frequencies, and down-link carriers for the respective station areas are selected from a down-link band of frequencies different from said up-link band of frequencies; and wherein said system further comprises a second frequency responsive beam former connected to said radiating elements, each of said beam formers introducing delays between signals of respective ones of said radiating elements, one of said beam formers forming beams in said up-link frequency band and the other of said beam formers forming beams in said down-link frequency band.

8. A system according to claim 7 wherein each of said beam formers scans beams in a plane directed along an arc of the earth's surface.

9. A system according to claim 8 wherein said scanning is accomplished in an east-west direction.

* * * * *